United States Patent
Shifrin et al.

(10) Patent No.: US 12,057,355 B2
(45) Date of Patent: Aug. 6, 2024

(54) SEMICONDUCTOR DEVICE MANUFACTURE WITH IN-LINE HOTSPOT DETECTION

(71) Applicant: NOVA LTD, Rehovot (IL)

(72) Inventors: Michael Shifrin, Rehovot (IL); Avron Ger, Rehovot (IL)

(73) Assignee: NOVA LTD, Rehovot (IL)

( * ) Notice: Subject to any disclaimer, the term of this patent is extended or adjusted under 35 U.S.C. 154(b) by 481 days.

(21) Appl. No.: 17/607,044

(22) PCT Filed: Apr. 28, 2020

(86) PCT No.: PCT/IB2020/053985
§ 371 (c)(1),
(2) Date: Oct. 28, 2021

(87) PCT Pub. No.: WO2020/222115
PCT Pub. Date: Nov. 5, 2020

(65) Prior Publication Data
US 2022/0208620 A1 Jun. 30, 2022

Related U.S. Application Data

(60) Provisional application No. 62/839,712, filed on Apr. 28, 2019.

(51) Int. Cl.
*G06F 30/367* (2020.01)
*G06F 30/398* (2020.01)
(Continued)

(52) U.S. Cl.
CPC ............ *H01L 22/24* (2013.01); *G06F 30/367* (2020.01); *G06F 30/398* (2020.01); *G06F 2119/18* (2020.01)

(58) Field of Classification Search
CPC ..... H01L 22/24; G06F 30/367; G06F 30/398; G06F 2119/18; Y02P 90/02; G03F 7/20;
(Continued)

(56) References Cited

U.S. PATENT DOCUMENTS

2015/0253373 A1* 9/2015 Callegari ........... G01R 31/2601
702/58
2017/0109646 A1 4/2017 David
(Continued)

FOREIGN PATENT DOCUMENTS

| CN | 107004060 A | 8/2017 |
|---|---|---|
| WO | WO2016/086138 A1 | 6/2016 |
| WO | 2017/194281 A1 | 11/2017 |

OTHER PUBLICATIONS

Duo Ding, et al., "Machine learning based lithographic hotspot detection with critical-feature extraction and classification," 2009 IEEE International Conference on IC Design and Technology, May 18, 2009, pp. 219-222, IEEE, Manhattan, NY, USA.
(Continued)

*Primary Examiner* — Paul Dinh
(74) *Attorney, Agent, or Firm* — AlphaPatent Associates Ltd.; Daniel J. Swirsky

(57) ABSTRACT

Controlling semiconductor device manufacture by acquiring training scatterometric signatures collected at training locations on training semiconductor wafers and corresponding to locations within a predefined design of a training semiconductor device, the training signatures collected after predefined processing steps during manufacture of the device on the training wafers, acquiring manufacturing outcome data associated with the training locations, training a prediction model using the training signatures and the manufacturing outcome data, and applying the prediction model to a candidate scatterometric signature to predict a manufacturing outcome, the candidate signature collected at a
(Continued)

candidate location on a candidate semiconductor wafer, the candidate location corresponding to a location within the same predefined design of a candidate semiconductor device, the candidate signature collected after any of the processing steps during manufacture of the candidate device on the candidate wafer.

24 Claims, 3 Drawing Sheets

(51) Int. Cl.
*H01L 21/66* (2006.01)
*G06F 119/18* (2020.01)

(58) Field of Classification Search
CPC .. G03F 7/70483; G03F 7/705; G03F 7/70625; G03F 7/70616; G06N 20/00
USPC ........................................................ 716/112
See application file for complete search history.

(56) References Cited

U.S. PATENT DOCUMENTS

| | | |
|---|---|---|
| 2018/0358271 A1 | 12/2018 | David |
| 2019/0004504 A1 | 1/2019 | Yati |
| 2019/0041202 A1 | 2/2019 | Saraswatula et al. |
| 2019/0064253 A1* | 2/2019 | David ................ G01R 31/2642 |
| 2019/0073566 A1 | 3/2019 | Brauer |
| 2021/0165398 A1* | 6/2021 | Pandev ................... H01L 22/20 |

OTHER PUBLICATIONS

Pierre Fanton, et al., "Process window optimizer for pattern based defect prediction on 28nm metal layer", Proc. SPIE 9778, Metrology, Inspection, and Process Control for Microlithography XXX, Mar. 8, 2016, vol. 9778, SPIE, Bellingham, WA USA.

* cited by examiner

SEMICONDUCTOR DEVICE MANUFACTURE WITH IN-LINE HOTSPOT DETECTION

BACKGROUND

When manufacturing semiconductor devices, defects may be caused by various manufacturing process steps. For example, Chemical-Mechanical Polishing (CMP) may cause unwanted variations in surface topography, such as due to dishing, erosion, or metal residuals, which can lead to elevated resistivity of metal lines or circuits shorts. Areas in a chip layout that are known or believed to be prone to such defects are often referred to as 'hotspots'.

Process-aware layout design and hotspot simulation are often employed during design for manufacturing (DFM), enabling designers to prevent or mitigate process-related hotspots by taking actions prior to manufacture, such as through better floor planning and dummy filling. Unfortunately, in order to determine whether such actions are effective, manufacturers currently either have to wait several months until electrical testing is done, or they can perform in-line tests (i.e., during manufacturing) that are slow, expensive, and often destructive.

SUMMARY

In one aspect of the invention a method is provided for use in controlling the manufacture of semiconductor devices, the method including acquiring training scatterometric signatures collected at a plurality of training locations on at least one training semiconductor wafer, where the plurality of training locations correspond to a plurality of locations within a predefined design of a training semiconductor device, and where the training scatterometric signatures are collected after one or more predefined processing steps during manufacture of the at least one training semiconductor device on the at least one training semiconductor wafer, acquiring manufacturing outcome data associated with any of the training locations, performing machine learning to train a prediction model using the training scatterometric signatures and the manufacturing outcome data, and applying the prediction model to a candidate scatterometric signature to predict a manufacturing outcome associated with the candidate scatterometric signature, where the candidate scatterometric signature is collected at a candidate location on a candidate semiconductor wafer, where the candidate location corresponds to a location within a predefined design of a candidate semiconductor device, where the predefined design of the candidate semiconductor device is the same as the predefined design of the at least one training semiconductor device, and where the candidate scatterometric signature is collected after one or more of the predefined processing steps during manufacture of the candidate semiconductor device on the candidate semiconductor wafer.

In another aspect of the invention any of the predefined processing steps are Chemical-Mechanical Polishing steps.

In another aspect of the invention the method further includes determining the training locations using locations of possible hotspots determined by Design For Manufacturing hotspot simulation.

In another aspect of the invention the acquiring manufacturing outcome data includes using at least one reference tool to detect a hotspot at any of the training locations.

In another aspect of the invention the acquiring manufacturing outcome data includes using at least one reference tool to detect at any of the training locations a manufacturing defect known to be associated with hotspots.

In another aspect of the invention the acquiring manufacturing outcome data includes detecting an electrical fault related to any of the training locations.

In another aspect of the invention the acquiring manufacturing outcome data includes collecting a measurement value of a physical feature characteristic at any of the training locations.

In another aspect of the invention the physical feature is any of a) structural geometry and b) material composition.

In another aspect of the invention the acquiring manufacturing outcome data includes associating a manufacturing defect of unknown type with any of the training locations whose training scatterometric signatures are identified, in accordance with predefined criteria for determining statistical outliers, as a statistical outlier relative to the training scatterometric signatures of others of the training locations.

In another aspect of the invention the applying the prediction model is performed during manufacture of the candidate semiconductor device.

In another aspect of the invention the applying the prediction model is performed upon acquiring the candidate scatterometric signature.

In another aspect of the invention the method further includes modifying any aspect of a manufacturing process used to manufacture any semiconductor device of the predefined design, where the modifying is performed responsive to the predicted manufacturing outcome.

In another aspect of the invention a system is provided for use in controlling the manufacture of semiconductor devices, the system including a scatterometric signature acquisition tool configured to acquire training scatterometric signatures collected at a plurality of training locations on at least one training semiconductor wafer, where the plurality of training locations correspond to a plurality of locations within a predefined design of a training semiconductor device, and where the training scatterometric signatures are collected after one or more predefined processing steps during manufacture of the at least one training semiconductor device on the at least one training semiconductor wafer, a manufacturing outcome data acquisition tool configured to acquire manufacturing outcome data associated with any of the training locations, a machine learning unit configured to perform machine learning to train a prediction model using the training scatterometric signatures and the manufacturing outcome data, and a prediction unit configured to apply the prediction model to a candidate scatterometric signature to predict a manufacturing outcome associated with the candidate scatterometric signature, where the candidate location corresponds to a location within a predefined design of a candidate semiconductor device, where the predefined design of the candidate semiconductor device is the same as the predefined design of the at least one training semiconductor device, and where the candidate scatterometric signature is collected after one or more of the predefined processing steps during manufacture of the candidate semiconductor device on the candidate semiconductor wafer.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
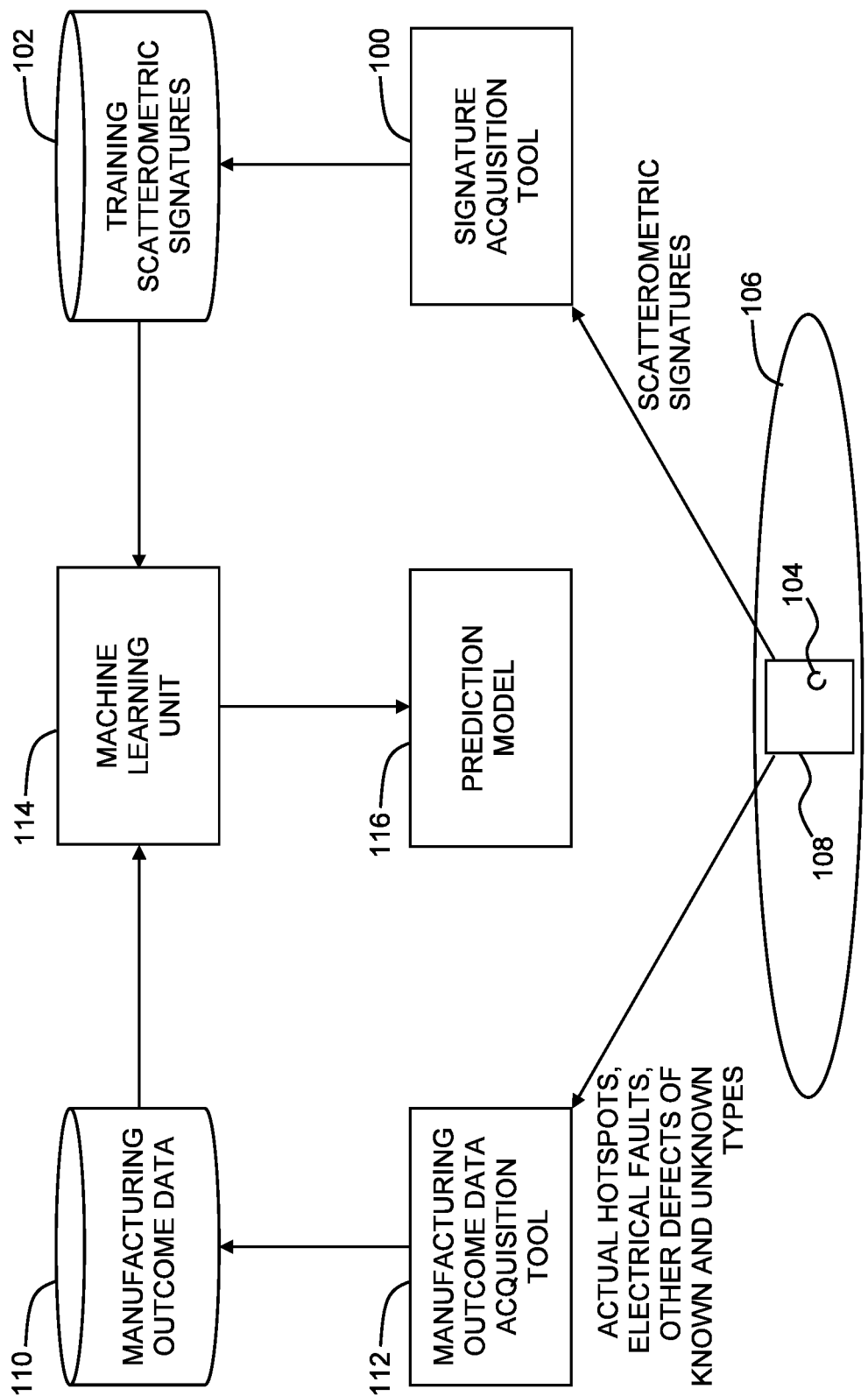
FIGS. 1A and 1B, taken together, is a simplified conceptual illustration of a system for controlling the manufacture of semiconductor devices, constructed and operative in accordance with an embodiment of the invention.
Figure 1B:
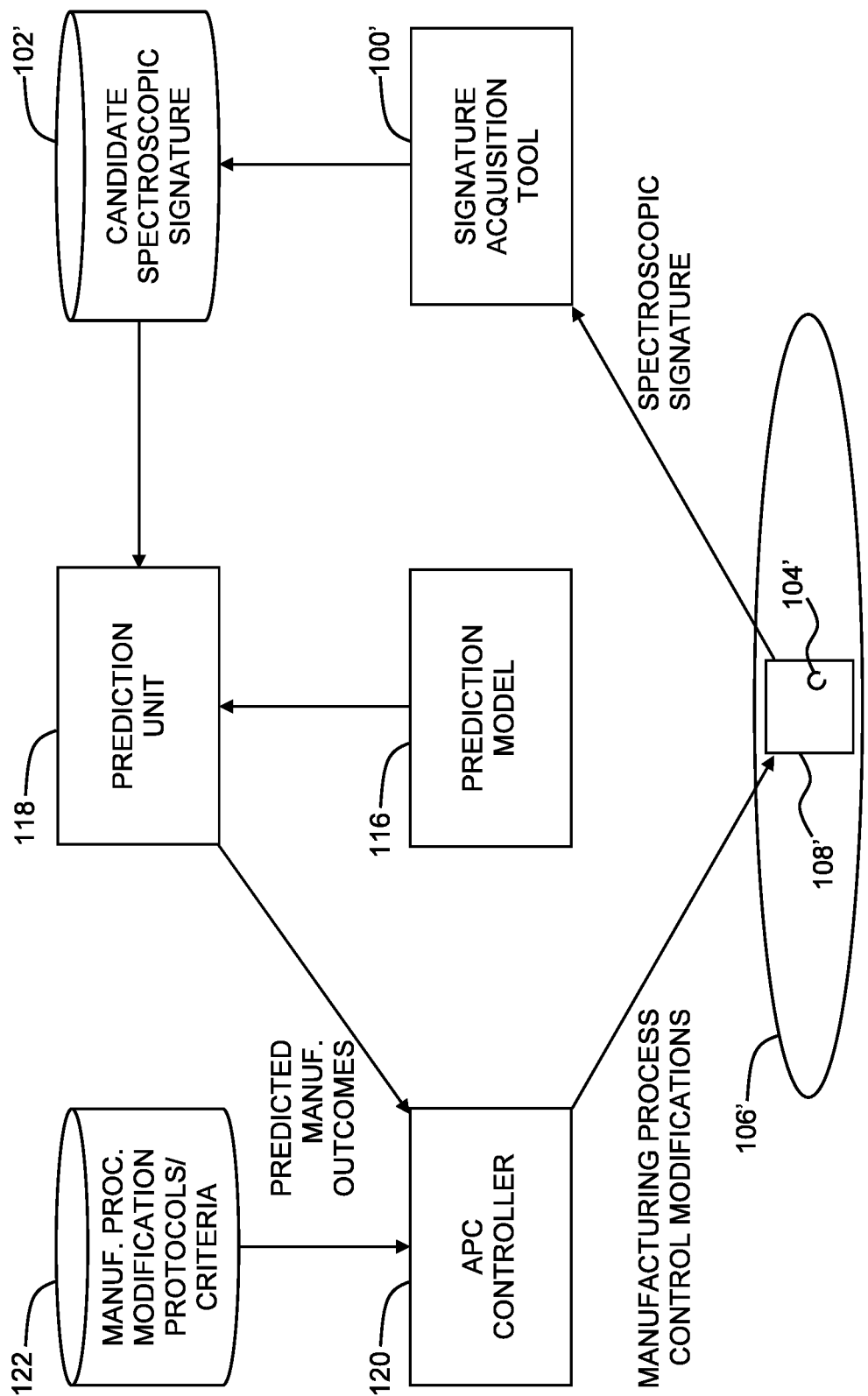

Reference is now made to FIGS. 1A and 1B, which, taken together, is a simplified conceptual illustration of a system for controlling the manufacture of semiconductor devices, constructed and operative in accordance with an embodiment of the invention. In FIG. 1A a scatterometric signature acquisition tool 100 is configured to acquire training scatterometric signatures 102 collected from one or more training locations 104 on one or more semiconductor wafers 106 during the manufacture of one or more semiconductor devices 108 of a predefined design on semiconductor wafers 106, where training locations 104 correspond to locations within the design of semiconductor devices 108. In one embodiment, scatterometric signature acquisition tool 100 itself performs spectroscopic reflectometry or ellipsometry on training locations 104 and collects training scatterometric signatures 102 therefrom, such as where scatterometric signature acquisition tool 100 is itself, or otherwise controls, a Spectral Ellipsometer (SE), a Spectral Reflectometer (SR), a Polarized Spectral Reflectometer, or any other metrology tool or combinations of tools configured for measuring Critical Dimension (CD), such as Interferometric, X-ray based (XRS/XRD), Raman, and Pump-Probe tools, among others. Some examples of such tools are disclosed e.g. in WO2018/211505, U.S. Pat. Nos. 10,161,885, 1,005,4423, 9,184,102, and 10,119,925, all assigned to the Applicant and incorporated herein by reference in their entirety. In another embodiment scatterometric signature acquisition tool 100 acquires training scatterometric signatures 102 from one or more separate tools (not shown) that themselves collect training scatterometric signatures 102 from training locations 104. Training scatterometric signatures 102 are collected after one or more predefined processing steps during the manufacture of semiconductor devices 108 on semiconductor wafers 106, such as just after completion of a given Chemical-Mechanical Polishing (CMP) step and/or after one or more other processing steps. In one embodiment, training locations 104 on semiconductor wafers 106 are determined in accordance with conventional design for manufacturing (DFM) techniques, such as by performing hotspot simulation based on the predefined design of semiconductor devices 108 on semiconductor wafers 106.

After training scatterometric signatures 102 are acquired, manufacturing outcome data 110 are acquired by a manufacturing outcome data acquisition tool 112. In one embodiment, manufacturing outcome data 110 includes data collected, in accordance with conventional techniques, by one or more reference tools indicating the presence at any of training locations 104 on semiconductor wafers 106 of actual hotspots or manufacturing defects known to be associated with hotspots, such as oxide or metal loss or recess. Such reference tools may, for example, include Critical Dimension Scanning Electron Microscope (CD-SEM), an Atomic Force Microscope (AFM), a Critical Dimension Atomic Force Microscope (CD-AFM), or a Transmission Electron Microscopy (TEM). Additionally or alternatively, manufacturing outcome data 110 includes data collected, in accordance with conventional techniques, during electrical testing of semiconductor devices 108 on semiconductor wafers 106, typically after the manufacture of semiconductor devices 108 has been completed, indicating the presence of electrical faults related to any of training locations 104 on semiconductor wafers 106. Additionally or alternatively, manufacturing outcome data 110 includes measurement values collected, in accordance with conventional techniques, of one or more physical feature characteristics at any of training locations 104 on semiconductor wafers 106, such as of structural geometry or material composition. Additionally or alternatively, manufacturing outcome data 110 includes statistical outliers, identified in accordance with predefined criteria for determining statistical outliers, among training scatterometric signatures 102 collected at any of training locations 104 on semiconductor wafers 106, which statistical outliers are assumed to be associated with manufacturing defects of unknown type.

A machine learning unit 114 is configured to perform machine learning (ML) in accordance with conventional techniques to train a prediction model 116 using training scatterometric signatures 102 and manufacturing outcome data 110, for use in predicting manufacturing outcomes, such as is now described with reference to FIG. 1B.

In FIG. 1B, a scatterometric signature acquisition tool 100', which may be scatterometric signature acquisition tool 100 or another similar or identical scatterometric signature acquisition tool configured in the manner described hereinabove for scatterometric signature acquisition tool 100, is configured to acquire a candidate scatterometric signature 102' collected from a candidate location 104' on a semiconductor wafer 106' during the manufacture of one or more semiconductor devices 108' on semiconductor wafer 106', such as during a later, high-volume manufacturing (HVM) process. Candidate location 104' corresponds to a location within the design of one of semiconductor devices 108', and corresponds to one of training locations 104 within one of semiconductor devices 108 that is of the same predefined design. Candidate scatterometric signature 102' is preferably collected during the manufacture of semiconductor wafer 106' after any processing step corresponding to any of the processing steps after which training scatterometric signatures 102 were collected from semiconductor wafers 106 from the corresponding training location 104.

A prediction unit 118 is configured to apply prediction model 116 to candidate scatterometric signature 102' to predict a manufacturing outcome at, or related to, candidate location 104' depending of the type of manufacturing outcome data 110 used to train prediction model 116. Prediction unit 118 preferably employs prediction model 116 during the manufacture of semiconductor wafer 106', and preferably immediately upon acquiring candidate scatterometric signature 102'. In one embodiment, prediction unit 118 predicts the likelihood that a hotspot or manufacturing defect known to be associated with hotspots, such as oxide or metal loss or recess, will occur at or above candidate location 104'. Additionally or alternatively, prediction unit 118 predicts the likelihood that an electrical fault will occur at, or related to, candidate location 104'. Additionally or alternatively, prediction unit 118 provides a predicted measurement value of one or more physical feature characteristics at candidate location 104'. Additionally or alternatively, prediction unit 118 predicts the likelihood that a manufacturing defect of unknown type will occur at candidate location 104'.

In one embodiment, prediction unit 118 is configured to provide a notification to one or more recipients, such as to a human operator or to an Advanced Process Control (APC) controller 120, indicating any predicted hotspot locations and physical feature measurement values, which information may then be used to modify any aspect of the current manufacturing process of semiconductor wafer 106' or of a manufacturing process used to manufacture any semiconductor device of the same predefined design in the future, such as in accordance with predefined manufacturing process modification protocols and criteria 122.

Figure 2:
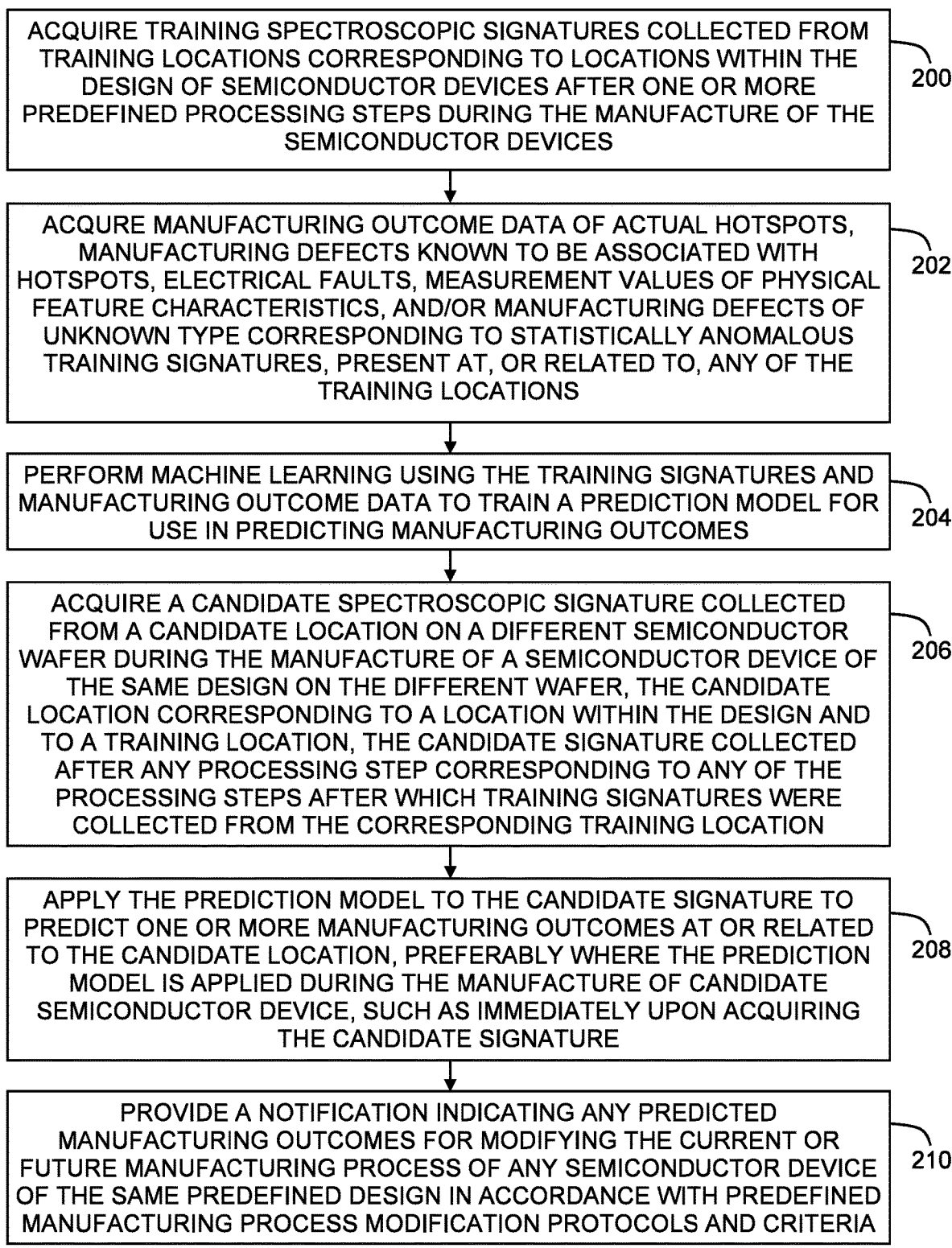
FIG. 2 is a simplified flowchart illustration of an exemplary method of operation of the system of FIGS. 1A and 1B, operative in accordance with an embodiment of the invention.

Reference is now made to FIG. 2 which is a simplified flowchart illustration of an exemplary method of operation of the system of FIGS. 1A and 1B, operative in accordance with an embodiment of the invention. In the method of FIG. 2, training scatterometric signatures are acquired after one or more predefined processing steps during the manufacture of semiconductor devices on one or more semiconductor wafers, where the training scatterometric signatures are collected from one or more training locations corresponding to locations within the design of the semiconductor devices (step 200). Manufacturing outcome data are acquired of actual hotspots, manufacturing defects known to be associated with hotspots, electrical faults, measurement values of physical feature characteristics, and/or manufacturing defects of unknown type corresponding to statistically anomalous signatures, present at, or related to, any of the training locations (step 202). Machine learning is performed using the training scatterometric signatures and manufacturing outcome data to train a prediction model for use in predicting manufacturing outcomes (step 204). A candidate scatterometric signature is acquired, where the candidate scatterometric signature is collected from a candidate location on a different semiconductor wafer during the manufacture of a semiconductor device of the same design on the different wafer, the candidate location corresponding to a location within the design and to a training location, the candidate scatterometric signature collected after any processing step corresponding to any of the processing steps after which training scatterometric signatures were collected from the corresponding training location (step 206). The prediction model is applied to the candidate scatterometric signature to predict one or more manufacturing outcomes depending of the type of manufacturing outcome data used to train the prediction model, including hotspots, electrical faults, measurement values of physical feature characteristics, and/or known or unknown manufacturing defect types at, or related to, the candidate location (step 208). A notification is provided indicating any predicted manufacturing outcome, which information is then used to modify any aspect of the current manufacturing process of the candidate semiconductor device or of a manufacturing process used to manufacture any semiconductor device of the same predefined design in the future, in accordance with predefined manufacturing process modification protocols and criteria (step 210).

Any aspect of the invention described herein may be implemented in computer hardware and/or computer software embodied in a non-transitory, computer-readable medium in accordance with conventional techniques, the computer hardware including one or more computer processors, computer memories, I/O devices, and network interfaces that interoperate in accordance with conventional techniques.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart illustrations and block diagrams in the drawing figures illustrate the architecture, functionality, and operation of possible implementations of systems, methods, and computer program products according to various embodiments of the invention. In this regard, each block in the flowchart illustrations or block diagrams may represent a module, segment, or portion of computer instructions, which comprises one or more executable computer instructions for implementing the specified logical function(s). In some alternative implementations, the functions noted in a block may occur out of the order noted in the drawing figures. For example, two blocks shown in succession may, in fact, be executed substantially concurrently, or the blocks may sometimes be executed in the reverse order, depending upon the functionality involved. It will also be noted that each block of the flowchart illustrations and block diagrams, and combinations of such blocks, can be implemented by special-purpose hardware-based and/or software-based systems that perform the specified functions or acts.

The descriptions of the various embodiments of the invention have been presented for purposes of illustration, but are not intended to be exhaustive or limited to the embodiments disclosed. For example, the systems and methods described herein are applicable to any type of structure on semiconductor wafers. Many modifications and variations will be apparent to those of ordinary skill in the art without departing from the scope and spirit of the described embodiments.

What is claimed is:

1. A method for use in controlling the manufacture of semiconductor devices, the method comprising:
   acquiring training scatterometric signatures collected at a plurality of training locations on at least one training semiconductor wafer,
      wherein the plurality of training locations correspond to a plurality of locations within a predefined design of a training semiconductor device, and
      wherein the training scatterometric signatures are collected after one or more predefined processing steps during manufacture of the at least one training semiconductor device on the at least one training semiconductor wafer;
   acquiring manufacturing outcome data associated with any of the training locations;
   performing machine learning to train a prediction model using the training scatterometric signatures and the manufacturing outcome data; and
   applying the prediction model to a candidate scatterometric signature to predict a manufacturing outcome associated with the candidate scatterometric signature,
      wherein the candidate scatterometric signature is collected at a candidate location on a candidate semiconductor wafer,
      wherein the candidate location corresponds to a location within a predefined design of a candidate semiconductor device,
      wherein the predefined design of the candidate semiconductor device is the same as the predefined design of the at least one training semiconductor device, and
      wherein the candidate scatterometric signature is collected after one or more of the predefined processing steps during manufacture of the candidate semiconductor device on the candidate semiconductor wafer.

2. The method according to claim 1 wherein any of the predefined processing steps are Chemical-Mechanical Polishing steps.

3. The method according to claim 1 and further comprising determining the training locations using locations of possible hotspots determined by Design For Manufacturing hotspot simulation.

4. The method according to claim 1 wherein the acquiring manufacturing outcome data comprises using at least one reference tool to detect a hotspot at any of the training locations.

5. The method according to claim 1 wherein the acquiring manufacturing outcome data comprises using at least one reference tool to detect at any of the training locations a manufacturing defect known to be associated with hotspots.

6. The method according to claim 1 wherein the acquiring manufacturing outcome data comprises detecting an electrical fault related to any of the training locations.

7. The method according to claim 1 wherein the acquiring manufacturing outcome data comprises collecting a measurement value of a physical feature characteristic at any of the training locations.

8. The method according to claim 7 wherein the physical feature is any of a) structural geometry and b) material composition.

9. The method according to claim 1 wherein the acquiring manufacturing outcome data comprises associating a manufacturing defect of unknown type with any of the training locations whose training scatterometric signatures are identified, in accordance with predefined criteria for determining statistical outliers, as a statistical outlier relative to the training scatterometric signatures of others of the training locations.

10. The method according to claim 1 wherein the applying the prediction model is performed during manufacture of the candidate semiconductor device.

11. The method according to claim 1 wherein the applying the prediction model is performed upon acquiring the candidate scatterometric signature.

12. The method according to claim 1 and further comprising modifying any aspect of a manufacturing process used to manufacture any semiconductor device of the predefined design, wherein the modifying is performed responsive to the predicted manufacturing outcome.

13. A system for use in controlling the manufacture of semiconductor devices, the system comprising:
a scatterometric signature acquisition tool configured to acquire training scatterometric signatures collected at a plurality of training locations on at least one training semiconductor wafer,
wherein the plurality of training locations correspond to a plurality of locations within a predefined design of a training semiconductor device, and
wherein the training scatterometric signatures are collected after one or more predefined processing steps during manufacture of the at least one training semiconductor device on the at least one training semiconductor wafer;
a manufacturing outcome data acquisition tool configured to acquire manufacturing outcome data associated with any of the training locations;
a machine learning unit configured to perform machine learning to train a prediction model using the training scatterometric signatures and the manufacturing outcome data; and
a prediction unit configured to apply the prediction model to a candidate scatterometric signature to predict a manufacturing outcome associated with the candidate scatterometric signature,
wherein the candidate location corresponds to a location within a predefined design of a candidate semiconductor device,
wherein the predefined design of the candidate semiconductor device is the same as the predefined design of the at least one training semiconductor device, and
wherein the candidate scatterometric signature is collected after one or more of the predefined processing steps during manufacture of the candidate semiconductor device on the candidate semiconductor wafer.

14. The system according to claim 13 wherein any of the predefined processing steps are Chemical-Mechanical Polishing steps.

15. The system according to claim 13 wherein the training locations correspond to locations of possible hotspots determined by Design For Manufacturing hotspot simulation.

16. The system according to claim 13 wherein the manufacturing outcome data are acquired using at least one reference tool to detect a hotspot at any of the training locations.

17. The system according to claim 13 wherein the manufacturing outcome data are acquired using at least one reference tool to detect at any of the training locations a manufacturing defect known to be associated with hotspots.

18. The system according to claim 13 wherein the manufacturing outcome data are acquired by detecting an electrical fault related to any of the training locations.

19. The system according to claim 13 wherein the manufacturing outcome data are acquired by collecting a measurement value of a physical feature characteristic at any of the training locations.

20. The system according to claim 19 wherein the physical feature is any of a) structural geometry and b) material composition.

21. The system according to claim 13 wherein the manufacturing outcome data indicate a manufacturing defect of unknown type associated with any of the training locations whose training scatterometric signature is identified, in accordance with predefined criteria for determining statistical outliers, as a statistical outlier relative to the training scatterometric signatures of others of the training locations.

22. The system according to claim 13 wherein the prediction unit is configured to apply the prediction model during manufacture of the candidate semiconductor device.

23. The system according to claim 13 wherein the prediction unit is configured to apply the prediction model upon acquiring the candidate scatterometric signature.

24. The system according to claim 13 wherein the prediction unit is configured to provide a notification, indicating the predicted manufacturing outcome, to a recipient configured to modify, responsive to the predicted manufacturing outcome, any aspect of a manufacturing process used to manufacture any semiconductor device of the predefined design.

* * * * *